(12) United States Patent
Ooga et al.

(10) Patent No.: US 6,586,508 B1
(45) Date of Patent: Jul. 1, 2003

(54) PLASTIC LENS MATERIAL, PRODUCTION PROCESS OF THE MATERIAL, COMPOSITION FOR PLASTIC LENS, PLASTIC LENS OBTAINED BY CURING THE COMPOSITION, AND PRODUCTION PROCESS OF THE PLASTIC LENS

(75) Inventors: Kazuhiko Ooga, Oita (JP); Yoshifumi Asai, Oita (JP); Yasuzi Tanaka, Oita (JP); Tsuneo Tajima, Oita (JP); Hiroshi Uchida, Oita (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 09/857,436

(22) PCT Filed: Apr. 11, 2001

(86) PCT No.: PCT/JP01/03132

§ 371 (c)(1),
(2), (4) Date: Jun. 4, 2001

(87) PCT Pub. No.: WO01/77718

PCT Pub. Date: Oct. 18, 2001

Related U.S. Application Data

(60) Provisional application No. 60/208,495, filed on Jun. 2, 2000.

(30) Foreign Application Priority Data

Apr. 11, 2000 (JP) .................................. 2000-108776

(51) Int. Cl.[7] .............................. C08J 3/00; C08K 3/20; C08K 5/09; C08K 5/10; C08L 67/07
(52) U.S. Cl. .................. 524/284; 264/496; 351/160 R; 351/160 H; 351/177; 523/106; 528/274; 528/307
(58) Field of Search ......................... 524/284; 523/106; 528/274, 307; 264/496; 351/160 R, 160 H, 177

(56) References Cited

U.S. PATENT DOCUMENTS 5,183,623 A * 2/1993 Kawaguichi et al.
5,498,668 A 3/1996 Scott

FOREIGN PATENT DOCUMENTS

EP 0 593 877 A 4/1994
EP 593877 A1 * 4/1994

* cited by examiner

Primary Examiner—Patrick D. Niland
(74) Attorney, Agent, or Firm—Sughrue Mion, PLLC

(57) ABSTRACT

A plastic lens material comprising a compound in which a part or all of 1,4-cyclohexane dicarboxylate structural units are a cis structure; a production process of the material; a plastic lens composition containing the material; a plastic lens obtained by curing the composition; and a production process of the plastic lens. A plastic lens material free of changing into a white and turbid material during storage for a long period of time is provided.

26 Claims, 4 Drawing Sheets

PLASTIC LENS MATERIAL, PRODUCTION PROCESS OF THE MATERIAL, COMPOSITION FOR PLASTIC LENS, PLASTIC LENS OBTAINED BY CURING THE COMPOSITION, AND PRODUCTION PROCESS OF THE PLASTIC LENS

CROSS-REFERENCE TO RELATED APPLICATIONS

This application is an application filed under 35 U.S.C. §111(a) claiming benefit pursuant to 35 U.S.C. §119(e) (1) of the filing date of the Provisional Application No. 60/208,495 filed Jun. 2, 2000, pursuant to 35 U.S.C. §111(b).

TECHNICAL FIELD

The present invention relates to a plastic lens material, a production process of the material, a plastic lens composition containing the material, a plastic lens obtained by curing the composition, and a production process of the plastic lens.

More specifically, the present invention relates to a plastic lens material which can produce a plastic lens while preventing the generation of uneven dyeing and which can be used for a plastic lens composition capable of preventing damaging of a mold used for the cast polymerization; a production process of the material; a plastic lens composition containing the material; a plastic lens obtained by curing the composition; and a production process of the plastic lens.

BACKGROUND ART

Recently, organic glass has been widely used for optical materials for cameras, televisions, prisms, telescopes and ophthalmic lenses. In particular, inorganic glass for ophthalmic lenses is being replaced by organic glass and, particularly, by plastic lenses. Under these circumstances, the plastic lens is required to be low in the weight, facilitated in the molding, and favored with good dyeability, evenly dyeable.

Representative examples of the resin conventionally used as a raw material for plastic lenses include polystyrene resin, polycarbonate resin, polymethyl methacrylate resin and polydiethylene glycol bis(allyl carbonate) resin. The physical properties and production methods of these resins have hitherto been known and are described in detail in, for example, *Plastic Age*, Vol. 35, pp. 198–202 (1989).

In this publication, the properties of the plastic lens derived from each resin are described as follows. The plastic lens derived from polystyrene resin has a problem in that a sufficiently high value cannot be obtained with respect to the birefringence and light scattering, though the refractive index is high. The plastic lens derived from polycarbonate resin is disadvantageously inferior in solvent resistance and scratch resistance, though the impact resistance are high. In the plastic lens derived from polymethyl methacrylate resin, the refractive index is low and the impact resistance are not at a satisfactory level.

Other than these, a plastic lens derived from polydiethylene glycol bis(allyl carbonate) resin is known (see, for example, EP 0473163A). This plastic lens is favored with superior properties particularly as a plastic lens for eyeglasses, such as excellent impact resistance and high Abbe number, despite the low refractive index of 1.498, therefore, this is most frequently used.

The polydiethylene glycol bis(allyl carbonate) resin is advantageous in that the polymerization reaction is easy to control because the polymerization reaction proceeds at a low speed as compared with acrylic resin.

Therefore, a uniform polymerization reaction can be attained and, by virtue of this, the plastic lens derived from the polydiethylene glycol bis(allyl carbonate) resin is reduced in optical strain.

The plastic lens derived from polydiethylene glycol bis (allyl carbonate) resin is also known to have excellent dyeing properties such that when the lens is dyed according to a general technique of dipping a plastic lens obtained by casting in a dyeing solution at a high temperature, the dyeing density is higher than those of plastic lenses derived from other resins.

However, the plastic lens derived from polydiethylene glycol bis(allyl carbonate) resin has a problem in that when the lens is polymerized in a mold for lenses and then the cured product is separated from the mold, the mold is damaged.

In general, a plastic lens is manufactured by so-called cast polymerization where a monomer is polymerized using two glass molds. The molds must be cleaned after casting and cleaning is usually performed using a strong alkaline solution or a strong acid. Unlike metal, glass is scarcely changed in quality by cleaning, therefore, glass is preferably used. Furthermore, glass can be easily polished and thereby extremely reduced in the surface roughness.

In the polymerization process, curing shrinkage generally occurs. On the other hand, the lens is required to perfectly imitate the curve of the glass surface and to this purpose, the monomer must exhibit good adhesion to the glass during the polymerization.

After the polymerization of monomer, the lens is disengaged from the glass mold. This process actually proceeds as follows. The mold is pried open by a wedge.

At this time, a very great energy is released and occasionally even a shock may be caused.

This releasing with such a force sometimes damages the glass mold. More specifically, the glass mold is partly drawn out and cannot be used as a glass mold any more. This phenomenon randomly occurs in the production of lenses. The loss caused by this usually reaches several % of the production yield of plastic lenses.

In order to decrease such damage to the mold, a slight amount of a mold-releasing agent is added in some cases, however, this adversely affects other properties of the lens, for example, adhesion of a scratch-resistant coating which is applied in the next step. Accordingly, the use of a mold-releasing agent is not proper for solving this problem.

Techniques for overcoming this problem are disclosed in JP-W-10-513574 (the term "JP-W" as used herein refers to a "Japanese Unexamined Patent Publication of International Patent Application") and International Patent Publications WO99/17137 and WO99/38899.

JP-W-10-513574 discloses use of a diallyl phthalate oligomer, whereby the problem of damaging the mold at the releasing can be somewhat overcome. However, this technique is still not at a satisfactory level.

Furthermore, by the addition of a diallyl phthalate oligomer, the cured lens is readily increased in the refractive index and this is not preferred from the standpoint of using a mold for use in the production of a plastic lens from poly[diethylene glycol bis(allyl carbonate)] resin. In addition, there is a problem in the weather resistance.

International Patent Publications WO99/17137 and WO99/38899 disclose use of a diallyl ester oligomer containing a cyclohexane dicarboxylate structure, whereby the problem of causing damaging of the mold at the releasing can be overcome. Also, even dyeing which is another property of dyeability required for a plastic lens can be attained, that is, the technique has an improvement effect also with respect to the inhibition of uneven dyeing.

However, the diallyl ester oligomer compounds containing a cyclohexane dicarboxylate structure disclosed in these publications have a relatively high crystallinity and suffer from a problem that when stored at a normal temperature or less for a long period of time, the compound becomes white and turbid.

In such a case, if the compound is redissolved by raising the temperature using some means, the compound may be used as a raw material of a plastic lens without any problem, however, a fear still remains for possibilities that the compound structure changes due to excess heating or in turn the improvement effect intended by the addition of the compound decreases. Furthermore, an extra process of heating the compound on use is necessary and the profitability is disadvantageously low in view of the energy required.

DISCLOSURE OF THE INVENTION

The present invention has been made as an attempt to improve the crystallinity of the diallyl ester oligomer compounds containing a cyclohexane dicarboxylate structure by taking notice of the problem that the compound becomes white and turbid when stored at normal temperature. Accordingly, the object of the present invention is to provide a plastic lens material, a production process of the material, a plastic lens composition containing the material, a plastic lens obtained by curing the composition, and a production process of the plastic lens, in which the effect of improving the releasability of a plastic lens from a mold and also the dyeability of the plastic lens as described in WO 99/17137 and WO99/38899 can be more simply implemented.

In order to solve the above-described problems, the present inventors have made extensive investigations on various physical properties of a diallyl ester oligomer containing a cyclohexane dicarboxylate structure, on resin compositions over a wide range including additives considered to be effective in preventing the compound from becoming white and turbid, and on the compositions thereof.

As a result, it has been found that a plastic lens material free of occurrence of changing into a white and turbid material due to crystallization at room temperature can be produced by controlling the ratio of a cis structure to a trans structure in the cyclohexane dicarboxylate structural units contained in a diallyl ester oligomer compound containing cyclohexane dicarboxylate structural units.

Furthermore, it has been found that a plastic lens composition comprising the above-described material and a poly(allyl carbonate) having a specific structure, and a plastic lens obtained by curing the composition can solve at the same time the problem of uneven dyeing in a cured product. The present invention has been accomplished based on these findings.

More specifically, the present invention (I) is a plastic lens material comprising a compound containing a group represented by the following general formula (1) as a terminal group and a group represented by the following general formula (2) as a repeating unit, wherein a part or all of 1,4-cyclohexane dicarboxylate structural units are a cis structure:

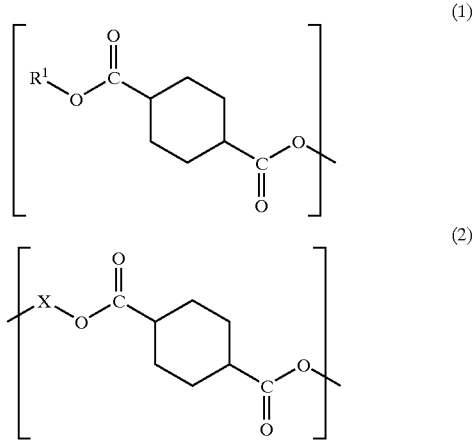

wherein each $R^1$ independently represents an allyl group or a methallyl group and each X independently represents an organic residue derived from a polyhydric alcohol having 2 to 20 carbon atoms and containing 2 to 6 hydroxy groups, provided that X may further contain a branched structure containing a terminal group of the general formula (1) and a repeating unit of the general formula (2), through an ester bond.

Incidentally, the terms "cis" and "trans" as used herein refer to the geometrical isomerism of a compound and this is described in detail in *Iwanami Rikagaku Jiten*, "*Kika Isei*" (*Iwanami Physics and Chemistry Encyclopedia*. "*Geometrical Isomerism*"), 3rd and enlarged edition (Feb. 5, 1987).

The present invention (II) is a process for producing the plastic lens material of the present invention (I), comprising the following first and second steps:

first step:
a step of reacting 1,4-cyclohexane dicarboxylic acid containing a cis structure with allyl alcohol and/or methallyl alcohol in the presence of a catalyst to obtain a 1,4-cyclohexane dicarboxylic acid ester; and second step:
a step of performing a transesterification reaction between the 1,4-cyclohexane dicarboxylic acid ester obtained in the first step and a polyhydric alcohol in the presence of a catalyst to obtain a compound for a plastic lens material.

The present invention (III) is a composition for a plastic lens, comprising as essential components at least one plastic lens material of the present invention (I) and at least one compound represented by the following general formula (3):

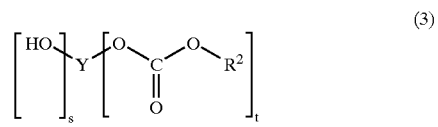

wherein Y represents one or more organic residue derived from a polyhydric saturated alcohol having 2 to 20 carbon atoms and containing 2 to 6 hydroxy groups, each $R^2$ independently represents an allyl group or a methallyl group, provided that where the number of hydroxy groups in Y is n, s is 0 or an integer of n-1, t is an integer of 1 to n, and s+t=n.

Incidentally, the term "entire curable component" as used herein refers to a total amount of the plastic lens material of the present invention (I), the compound represented by the above formula (3) and a monomer copolymerizable with the plastic lens material of the present invention (I) or the compound represented by the above formula (3).

The present invention (IV) is a composition for a plastic lens according to the present invention (III), further comprising from 0.1 to 10 parts by mass of at least one radical polymerization initiator per 100 parts by mass of the composition for a plastic lens of the present invention (III).

The present invention (V) is a plastic lens obtained by curing the composition for a plastic lens of the present invention (III) or the present invention (IV).

The present invention (VI) is a production process of the plastic lens of the present invention (V).

BRIEF DESCRIPTION OF DRAWINGS

Each figure is a 400 MHz $^1$H-NMR spectrum chart of the compound for a plastic lens material described in the Examples.

BEST MODE FOR CARRYING OUT THE INVENTION

Figure 1:
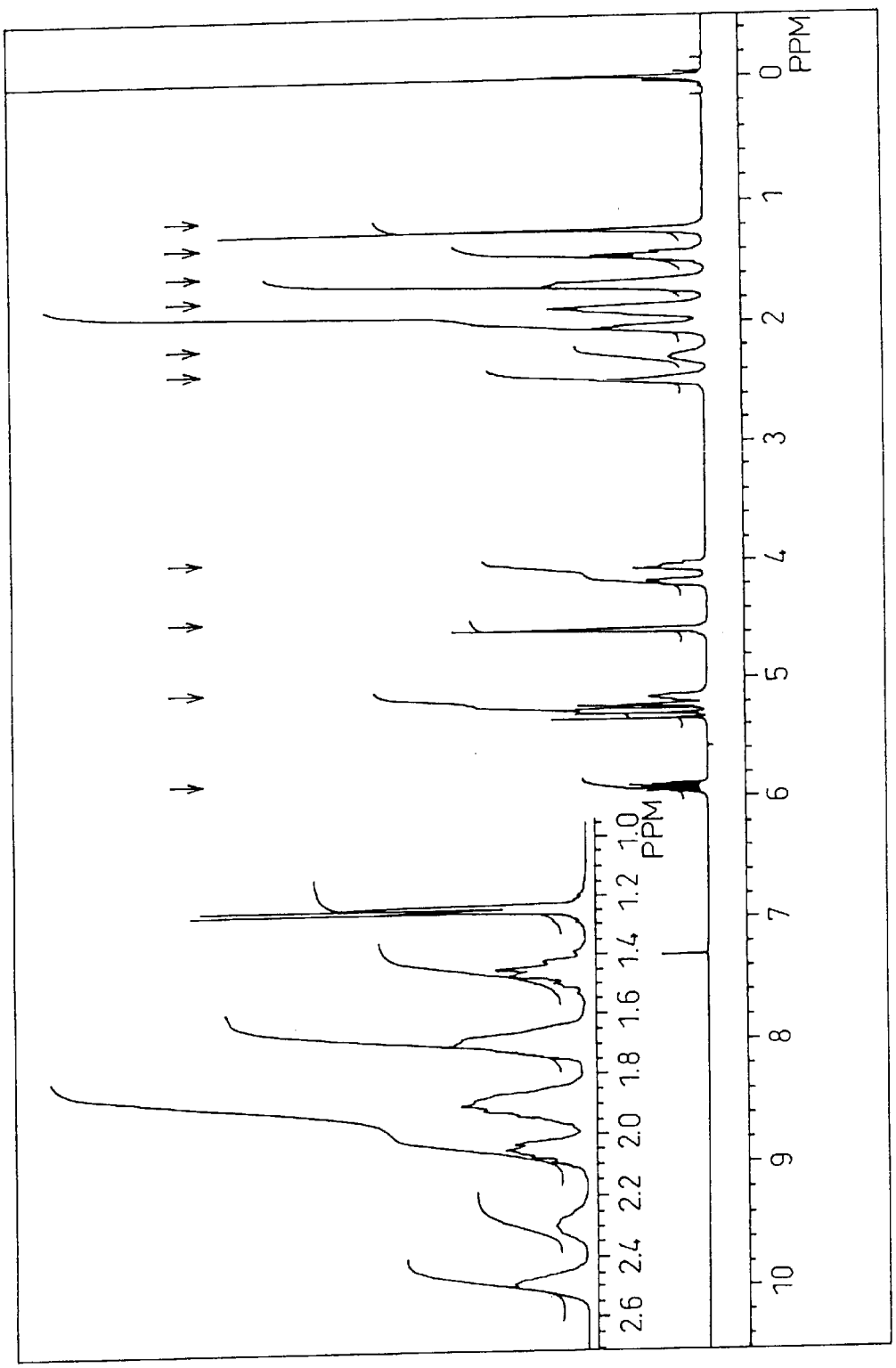
FIG. 1 is a 400 MHz $^1$H-NMR spectrum chart of Sample F (cis/trans=6.5/3.5).

The present invention is described in detail below.

First, the compound for a plastic lens material of the present invention (I) is described.

The present invention (I) is a plastic lens material comprising a compound containing a group represented by the above formula (1) as a terminal group and a group represented by the above formula (2) as a repeating unit, wherein a part or all of 1,4-cyclohexane dicarboxylate structural units are a cis structure.

Generally, a 1,4-cyclohexane dicarboxylate structural unit has stereoisomers of cis structure and trans structure. The 1,4-cyclohexane dicarboxylate structural unit of the plastic lens material of the present invention (I) is characterized by containing a cis structure. If the compound comprises only a trans structure, although it more or less varies depending on the structural unit of X, the crystallinity is generally high and the fluidity at room temperature is lost, therefore, the compound is liable to become white and turbid. To maintain the fluidity at room temperature, it is preferred that the cis structure comprises 30% or more, more preferably 50% or more, of all 1,4-cyclohexane dicarboxylate structural units.

In formula (1), each $R^1$ independently represents an allyl group or a methallyl group. In formula (2), each X independently represents an organic residue derived from a polyhydric alcohol having 2 to 20 carbon atoms and containing 2 to 6 hydroxy groups.

The term "each $R^1$ independently represents" as used herein indicates that $R^1$ is an allyl group in both terminal groups represented by formula (1), a methallyl group in both, or an allyl group in one terminal group and a methallyl group in the other terminal group.

The term "each X independently represents" as used herein indicates that, in the following general formula (4) as one example of the repeating unit represented by formula (2), m organic residues X contained in the repeating unit are independent of each other:

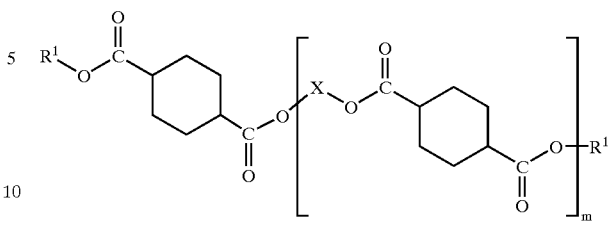

wherein each X independently represents an organic residue derived from a polyhydric alcohol having 2 to 20 carbon atoms and containing 2 to 6 hydroxy groups, and m represents 0 or an integer of 1 or more.

There arises no problem even if, for example, in the above formula (4), m organic residues X are all organic residues derived from different polyhydric alcohols (that is, the organic residues are derived one by one from m kinds of polyhydric alcohols) or all are an organic residue derived from the same kind of polyhydric alcohol (that is, m organic residues are derived from one kind of polyhydric alcohol). A mixed structure where some of m organic residues X are derived from the same kind of polyhydric alcohol and some others are derived from different kinds of polyhydric alcohols, may also be used.

Moreover, in this mixed structure, all may be completely random or a part thereof may be repeated.

In the case where a part or all of the organic residues X are derived from a polyhydric alcohol having 3 or more hydroxy groups, a part or all of X can further have a branched structure containing a terminal group of formula (1) and a repeating unit of formula (2), through an ester bond. More specifically, for example, when an organic residue derived from trimethylolpropane as one example of a trihydric saturated alcohol is present in X, the plastic lens material as the present invention (I) may have a partial structure represented by the following general formula (5):

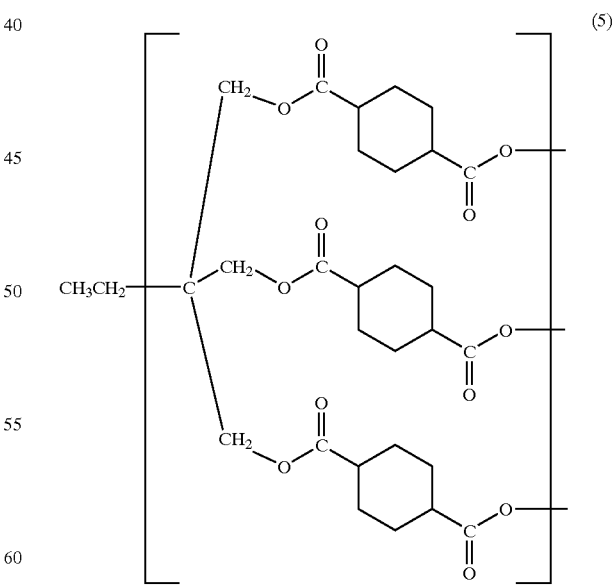

Of course, even when a part or all of X are an organic residue derived from a polyhydric alcohol having 3 or more hydroxy groups, X may not have a branched structure at all.

In formula (2), each X independently represents one or more kinds of organic residue derived from a polyhydric saturated alcohol having 2 to 20 carbon atoms and containing 2 to 6 hydroxy groups. Examples of the "polyhydric saturated alcohol having 2 to 20 carbon atoms and containing 2 to 6 hydroxy groups" include the following.

Specific examples of the dihydric saturated alcohol include ethylene glycol, propylene glycol, 1,3-propanediol, 1,4-butanediol, 1,3-butanediol, neopentyl glycol, hexamethylene glycol and 1,4-cyclohexanedimethanol.

Specific examples of the trihydric or greater hydric polyhydric saturated alcohol include glycerin, trimethylolpropane, trimethylolethane, penthaerythritol, dipentaerythritol and sorbitol. In addition, dihydric saturated alcohols containing an ether group in the main chain, such as diethylene glycol, dipropylene glycol, triethylene glycol and polyethylene glycol, may be used. Needless to say, the present invention is not limited to these specific examples.

Among these polyhydric saturated alcohols, in view of the fluidity of the compound comprised in the plastic lens material of the present invention (I), propylene glycol and neopentyl glycol are preferred, and propylene glycol is more preferred.

The repeating number of the group represented by formula (2) as a repeating unit in the plastic lens material of the present invention (I) is not particularly limited. A mixture of materials having various repeating numbers may also be used. Furthermore, there arises no problem even if a material where the repeating number is 0 and a material where the repeating number is an integer of 1 or more are used in combination. However, use of only the compound where the repeating number is 0 is not preferred from the standpoint of achieving the object of the present invention.

Usually, the repeating number of the group represented by formula (2) as a repeating unit in the plastic lens material of the present invention (I) is preferably an integer of 1 to 50. If a plastic lens material comprising only compounds where the repeating number exceeds 50 is used for a plastic lens composition, the allyl group concentration decreases and this may cause adverse effects, for example, at curing, the curing may be retarded or a part of the compound may remain uncured to deteriorate the physical properties of the cured product, such as mechanical properties. All compounds in the plastic lens material preferably have a repeating number of an integer of 1 to 50, more preferably 1 to 30, still more preferably 1 to 10.

Depending on the production conditions, the 1,4-cyclohexane dicarboxylic acid ester as a raw material may remain in the plastic lens material of the present invention (I) but the plastic lens material may be used as it is. However, if the 1,4-cyclohexanedicarbocylic acid ester as a raw material is present in a proportion of 70 mass% or more based on the total amount of the plastic lens material of the present invention (I), when the material is blended with the compound of formula (3) to prepare a plastic lens composition which is described later, uneven dyeing may be generated or the mold may be damaged at the time of separating the cured product from the glass mold.

Incidentally, the term "1,4-cyclohexane dicarboxylic acid ester" as used herein includes diallyl 1,4-cyclohexanedicarboxylate where two carboxyl groups both are allylated, dimethallyl 1,4-cyclohexanedicarboxylate where both are methallylated, and allylmethallyl 1,4-cyclohexanedicarboxylate where one is allylated and the other is methallylated.

The present invention (II) is described below.

The present invention (II) is a process for producing the plastic lens material of the present invention (I), comprising the following first and second steps:

first step:
a step of reacting 1,4-cyclohexane dicarboxylic acid containing a cis structure with allyl alcohol and/or methallyl alcohol in the presence of a catalyst to obtain a 1,4-cyclohexane dicarboxylic acid ester; and second step:
a step of performing a transesterification reaction between the 1,4-cyclohexane dicarboxylic acid ester obtained in the first step and a polyhydric alcohol in the presence of a catalyst to obtain a compound for a plastic lens material.

The plastic lens material of the present invention (I) containing a moiety where the 1,4-cyclohexane dicarboxylate structural unit is a cis form, can be produced, for example, by the following method.

In the first step, 1,4-cyclohexane dicarboxylic acid containing a cis structure and allyl alcohol and/or methallyl alcohol are esterified using a catalyst to obtain a 1,4-cyclohexane dicarboxylic acid ester. The term "1,4-cyclohexane dicarboxylic acid ester" as used herein includes, as described above, diallyl 1,4-cyclohexanedicarboxylate, dimethallyl 1,4-cyclohexane dicarboxylate and allylmethallyl 1,4-cyclohexane dicarboxylate.

Subsequently, in the second step, the thus-obtained 1,4-cyclohexane dicarboxylic acid ester and a polyhydric alcohol are subjected to transesterification in the presence of a catalyst, whereby an objective plastic lens material can be obtained. Of course, the present invention is not limited thereto and a step such as purification may be added, if desired.

The catalyst used in the first step is not particularly limited as far as it is a catalyst capable of generally synthesizing an ester from a carboxylic acid and an alcohol. Those called acid catalysts are particularly suitable and specific examples thereof include p-toluenesulfonic acid, methanesulfonic acid, sulfuric acid and hydrochloric acid but the present invention is not limited thereto. Among these, p-toluenesulfonic acid and methanesulfonic acid are preferred.

The reaction temperature in the first step is not particularly limited but it depends on the boiling point of the solvent used as an entrainer. The reaction temperature is preferably 60 to 140° C., more preferably 80 to 120° C., though this varies depending on the solvent used.

In the first step, a solvent may be used, if desired. The solvent which can be used is not particularly limited as far as it does not inhibit the esterification reaction. Specific examples thereof include benzene, toluene, xylene and cyclohexane, but the present invention is not limited thereto. Among these, benzene and toluene are preferred.

The catalyst used in the second step is not particularly limited as far as it is a catalyst which can be generally used in the transesterification reaction. An organic metal compound is particularly preferred and specific examples thereof include tetraisopropoxy titanium, tetrabutoxy titanium, dibutyltin oxide, dioctyltin oxide, hafnium acetylacetonate and zirconium acetylacetonate, however, the present invention is not limited thereto. Among these, dibutyltin oxide and dioctyltin oxide are preferred.

The reaction temperature in the second step is not particularly limited but it is preferably 100 to 230° C., more preferably 120 to 200° C. Particularly in the case of using a solvent, the reaction temperature is sometimes limited by the boiling point of the solvent.

In the second step, a solvent is usually not used, however, a solvent may be used, if desired. The solvent which can be used is not particularly limited as far as it does not inhibit the ester exchange reaction. Specific examples thereof include benzene, toluene, xylene and cyclohexane, but the present invention is not limited thereto. Among these, benzene and toluene are preferred. However, as described above, the second step can be performed without using a solvent.

The plastic lens composition of the present invention (III) or the present invention (IV) is described below.

The present invention (III) is a composition for a plastic lens, comprising as essential components at least one plastic lens material of the present invention (I) and at least one compound represented by the above formula (3).

The present invention (IV) is a composition for a plastic lens according to the present invention (III) comprising from 0.1 to 10 parts by mass of at least one radical polymerization initiator per 100 parts by mass of the composition for a plastic lens of the present invention (III).

The compound represented by formula (3) contained in the plastic lens composition of the present invention (III) or the present invention (IV) can be synthesized by a conventional method. Examples thereof include a method of performing a transesterification reaction between diallyl carbonate and a polyhydric alcohol in the presence of a catalyst (see, JP-B-3-66327 (the term "JP-B" as used herein refers to a "Japanese examined patent publication")) and a method of reacting allyl alcohol with phosgene and a polyhydric alcohol while effecting dehydrochlorination (U.S. Pat. No. 2,370,565 and U.S. Pat. No. 2,592,058), but the present invention is not limited thereto.

In formula (3), Y represents one or more organic residues derived from a polyhydric saturated alcohol having 2 to 20 carbon atoms and containing 2 to 6 hydroxy groups. Examples of the "polyhydric saturated alcohol having 2 to 20 carbon atoms and containing 2 to 6 hydroxy groups" as used herein include the followings.

Specific examples of the dihydric saturated alcohol include ethylene glycol, propylene glycol, 1,3-propanediol, 1,4-butanediol, 1,3-butanediol, neopentyl glycol, hexamethylene glycol and 1,4-cyclohexane dimethanol.

Specific examples of the trihydric or greater hydric polyhydric saturated alcohol include glycerin, trimethylolpropane, trimethylolethane, penthaerythritol, dipentaerythritol and sorbitol. In addition, dihydric saturated alcohols containing an ether group in the main chain, such as diethylene glycol, dipropylene glycol, triethylene glycol, or polyethylene glycol may also be used. Needless to say, the present invention is not limited to these specific examples.

Among these polyhydric saturated alcohols, preferred are ethylene glycol, propylene glycol, diethylene glycol and dipropylene glycol, more preferred is diethylene glycol. When diethylene glycol is used as the polyhydric saturated alcohol, the compound obtained is diethylene glycol bis (allyl carbonate) and specific examples thereof include CR-39, a trade name, produced by PPG, and Nouryset 20, a trade name, produced by Akzo Nobel.

In formula (3), each $R^2$ independently represents an allyl group or a methallyl group. For example, when n is 3, the compound of formula (3) is a mixture of the compounds represented by the following general formulae (6) to (8):

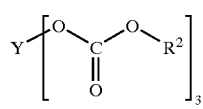

(6)

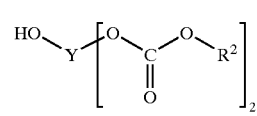

(7)

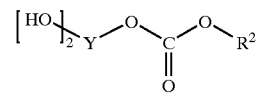

(8)

In these compounds, for example, in formula (6), three $R^2$ may all be an allyl group or all may be a methallyl group. It is also possible that two $R^2$ are an allyl group and one $R^2$ is a methallyl group, or one $R^2$ is an allyl group and two $R^2$ are a methallyl group. Of course, the same applies to two $R^2$ in formula (7).

In formula (3), Y is one or more organic residue derived from a polyhydric saturated alcohol having 2 to 20 carbon atoms and containing 2 to 6 hydroxy groups. If a compound having an organic residue derived from a polyhydric saturated alcohol where the number of the hydroxyl groups in Y is an integer in excess of 6, is used in the composition for a plastic lens, the plastic lens obtained by curing the composition may be disadvantageously deteriorated in the impact resistance. Also, if a compound having an organic residue derived from a polyhydric saturated alcohol where the number of the hydroxyl groups in Y is an integer less than 2 (that is, 1), is used in the composition for a plastic lens, the plastic lens obtained by curing is disadvantageously deteriorated in heat resistance and solvent resistance to an extreme extent.

Assuming that the number of hydroxy groups in Y is n, s is 0 or an integer of n-1, t is an integer of 1 to n, and s+t=n in formula (3), t may be an integer of 1 or more but in view of the physical properties of the final plastic lens, as many hydroxy groups as possible are preferably substituted for the carbonate group. Although it varies depending on the proportion of respective compounds where t is less than n, the compound where t=n preferably accounts for 80 mass% or more, more preferably 90 mass% or more, in the compound represented by formula (3).

The amount of the plastic lens material of the present invention (I) blended is preferably 0.05 to 30 mass%, more preferably 0.5 to 15 mass%, based on the entire curable component contained in the plastic lens composition of the present invention (III) or the present invention (IV).

If the amount of the material blended is less than 0.05 mass%, the effect of reducing uneven dyeing may not be brought out, whereas if the amount blended exceeds 30 mass%, the profitability is disadvantageously low, though there is no problem in the performance.

The amount of the compound represented by formula (3) is preferably 50 to 99.95 mass%, more preferably 70 to 98 mass%, based on the entire curable component contained in the plastic lens composition of the present invention (III) or the present invention (IV). If the amount blended is less than 50 mass%, the plastic lens obtained by curing the composition may be deteriorated in the mechanical properties and optical properties, whereas if it exceeds 99.95 mass%, unsatisfactory dyeing disadvantageously occurs.

The plastic lens composition of the present invention (III) or the present invention (IV) may contain, mainly for the purpose of adjusting the viscosity of the composition, one or more monomers copolymerizable with the plastic lens material of the present invention (I) or the compound represented by formula (3) within the range not exceeding 20 mass% based on the entire curable component contained in the resin composition for a plastic lens of the present invention.

Examples of the monomer include monomers having an acryl group, a vinyl group or an allyl group. Specific examples of the monomer having an acryl group include methyl (meth)acrylate and isobornyl (meth)acrylate; specific examples of the monomer having a vinyl group include vinyl acetate and vinyl benzoate; and specific examples of the monomer having an allyl group include diallyl 1,2-cyclohexane dicarboxylate and diallyl 1,3-cyclohexane dicarboxylate. Of course, the present invention is not limited to these specific examples and within the range of not impairing the physical properties of the plastic lens obtained by the curing, diallyl phthalate, diallyl terephthalate, diallyl isophthalate, allyl benzoate and the like can also be used.

On taking account of workability in casting, the viscosity of the plastic lens composition of the present invention (III) or the present invention (IV) may generally be in the range from 10 to 10,000 mPa·s at 25° C., preferably from 10 to 1,000 mPa·s, more preferably from 10 to 200 mPa·s.

The term "viscosity" as used herein is a viscosity measured by a rotational viscometer. The rotational viscometer is described in detail in *Iwanami Rikagaku Jiten* (*Iwanami Physics and Chemistry Encyclopedia*), 3rd ed., 8th imp. (Jun. 1, 1977).

The amount of the monomer added is preferably 20 mass% or less, more preferably 10 mass% or less, and still more preferably 5 mass% or less, based on the entire curable component contained in the composition for a plastic lens of the present invention. If the monomer is added in excess of 20 mass%, the physical property values required for the plastic lens obtained by curing the resin, such as optical property, may be disadvantageously reduced. An optimal monomer may be selected by taking account of the kind and the mixing ratio of poly(allyl carbonate) and allyl ester oligomer contained in the composition for a plastic lens and the physical property values such as optical property required for the plastic lens obtained by the curing.

The plastic lens composition of the present invention (IV) may contain a radical polymerization initiator as a curing agent and this is preferred.

The radical polymerization initiator which can be added to the plastic lens composition of the present invention (IV) is not particularly limited and a known radical polymerization initiator may be added as long as it does not adversely affect the physical property values of the plastic lens obtained by the curing.

The radical polymerization initiator for use in the present invention is, however, preferably soluble in other components present in the composition which is cured, and generates free radicals at 30 to 120° C. Specific examples of the radical polymerization initiator which can be added include diisopropylperoxy dicarbonate, dicyclohexylperoxy dicarbonate, di-n-propylperoxy dicarbonate, di-sec-butylperoxy dicarbonate and tert-butyl perbenzoate, but the present invention is not limited thereto. In view of the curability, diisopropylperoxy dicarbonate is preferred.

The amount of the radical polymerization initiator added is preferably in the range 0.1 to 10 parts by mass, more preferably 1 to 5 parts by mass, per 100 parts by mass of the entire curable component contained in the plastic lens composition of the present invention (III). If the amount added is less than 0.1 part by mass, curing of the composition may proceed insufficiently, whereas if it exceeds 10 parts by mass, the profitability may be disadvantageously low.

The plastic lens composition of the present invention (III) or the present invention (IV) may contain additives commonly used for the purpose of improving the performance of the plastic lens, such as a coloring agent including dyes and pigments, an ultraviolet absorber, a mold-releasing agent and an antioxidant.

Examples of the coloring agent include organic pigments such as of anthraquinone, azo, carbonium, quinoline, quinoneimine, indigoid and phthalocyanine series; organic dyes such as azoic dyes and sulfur dyes; and inorganic pigments such as titanium yellow, yellow iron oxide, zinc yellow, chrome orange, molybdenum red, cobalt violet, cobalt blue, cobalt green, chromic oxide, titanium oxide, zinc sulfide and carbon black.

Examples of the mold-releasing agent include stearic acid, butyl stearate, zinc stearate, stearic acid amide, fluorine-containing compounds and silicone compounds.

Examples of the ultraviolet absorber include triazoles such as 2-(2'-hydroxy-tert-butylphenyl)benzotriazole, benzophenones such as 2,4-dihydroxybenzophenone, salicylates such as 4-tert-butylphenyl salicylate, and hindered amines such as bis-(2,2,6,6-tetramethyl-4-piperidinyl) sebacate.

Examples of the antioxidant include phenols such as 2,6-di-tert-butyl-4-methylphenol and tetrakis[methylene-3-(3',5'-di-tert-butyl-4-hydroxyphenyl)propionate]methane; sulfur compounds such as dilauryl-3,3'-thiodipropionate; and phosphorus-containing antioxidants such as tris-nonylphenylphosphite.

The total amount of the additives added, such as a coloring agent including dye and pigment, an ultraviolet absorber, a release agent and an antioxidant, is preferably 1 part by mass or less based on the entire curable component contained in the resin composition for a plastic lens of the present invention.

The present invention (V) is described below.

The present invention (V) is a plastic lens obtained by curing the plastic lens composition of the present invention (III) or the present invention (IV).

The plastic lens of the present invention should preferably have a refractive index of 1.497 to 1.505 at 25° C. The mold for use in the production of a plastic lens (refractive index: 1.498 at 25° C., for example) using the compound represented by formula (3) as a raw material is a mold suitable only for the production of plastics having the same refractive index. As far as the same mold is used, the change in the refractive index works out to the change in the ability of the lens.

In the case of forming a composition into a lens having a higher refractive index, a different mold is necessary for obtaining a plastic lens having the same ability. Accordingly, the refractive index of a lens obtained must be limited, so that the improvement on the properties of a lens can be attained by the introduction of the plastic lens material of the present invention (I), the compound represented by formula (3) and a monomer copolymerizable with the plastic lens material of the present invention (I) or the compound represented by formula (3), while dispensing with the changing of the mold. The refractive index of the plastic lens of the present invention is more preferably 1.498 to 1.505 at 25° C., still more preferably 1.498 to 1.503.

Finally, the present invention (VI) is described.

The present invention (VI) is a production process of the plastic lens of the present invention (V), comprising curing the plastic lens composition of the present invention (III) or the present invention (IV).

In the present invention, the working in molding the plastic lens composition is suitably performed by casting. Specific examples thereof include a method of adding a radical polymerization initiator to the composition, injecting the mixture through a line into a mold fixed by an elastomer gasket or a spacer, and curing it under heating in an oven.

The constructive material of the mold used here may be a metal or glass. In general, the mold for plastic lenses must be cleaned after the casting and such cleaning is usually performed using a strong alkali solution or a strong acid. Unlike metal, glass is scarcely changed in the quality by the cleaning and furthermore, glass can be easily polished and thereby extremely reduced in the surface roughness, therefore, glass is preferably used.

The plastic lens composition of the present invention (III) or the present invention (IV) has a cyclohexane ring structure, therefore, the refractive index can be easily approximated to the refractive index 1.498 of a plastic lens starting from polydiethylene glycol bis(allyl carbonate) which is used for plastic lenses in many cases. This is advantageous in that the mold or the like conventionally used in the molding does not need to be changed but can be used as it is.

The curing temperature at the molding is preferably about 30 to 120° C., more preferably 40 to 100° C. On taking account of shrinkage or strain at the curing, the curing temperature is preferably operated by a method of allowing the curing to gradually proceed while elevating the temperature. The curing time may generally be 0.5 to 100 hours, preferably 3 to 50 hours, more preferably 10 to 30 hours.

The method for dyeing the plastic lens of the present invention is not particularly limited. Any method may be used as far as it is a known dyeing method for plastic lenses. Among these, a dip dyeing method as a conventionally known ordinary method is preferred. The "dip dyeing method" as used herein may be a method of dispersing a disperse dye together with a surfactant in water to prepare a dyeing solution and dipping a plastic lens in this dyeing solution under heating, thereby dyeing the plastic lens.

The method for dyeing a plastic lens is not limited to the dip dyeing method but other known methods may be used, such as a method of sublimating an organic pigment and thereby dyeing a plastic lens (see, JP-B-35-1384) and a method of sublimating a sublimable dye and thereby dyeing a plastic lens (see, JP-B-56-159376 and JP-B-1-277814). In view of the simple operation, the dip dyeing method is most preferred.

The present invention is described in greater detail below by referring to the Examples, however, the present invention should not be construed as being limited thereto.

Various physical properties were measured as follows.

1. Refractive Index ($n_D$) and Abbe Number

A test piece of 9 mm×16 mm×4 mm was prepared and measured for the refractive index ($n_D$) and Abbe number ($V_D$) at room temperature using "Abbe Refractometer 1T" manufactured by Adaco. The contact solvent used was α-bromonaphthalene.

2. Viscosity

The viscosity was measured at 25° C. using Model B Viscometer (Model BU8) manufactured by Tokyo Keiki Co., Ltd.

3. Barcol Hardness

The Barcol hardness was measured using Model 934-1 according to JIS K-6911.

4. Dyeing Method and Evaluation of Uneven Dyeing

To a 1 l beaker, 0.8 g of Sumikaron Blue E-FBL (produced by Sumitomo Chemical Co., Ltd.) and 0.5 l of water were added and dissolved with stirring. The resulting solution was heated in a water bath at 80° C. and into this disperse dye solution, cured plastic lens samples each fixed to a holder so as not to overlap one another were dipped at 80° C. for 10 minutes. Thereafter, the samples were taken out, thoroughly washed with water and then hot-air dried in an oven at 30° C.

The thus-obtained dyed plastic lens samples were observed with an eye and those failed in having a uniformly dyed appearance and revealed to have uneven dyeing were rated "defective". In the evaluation of 300 cured samples in total, the number of "defective" samples was counted.

5. Determination of Cis/trans Ratio of Allyl Ester Resin

The ratio was determined from the integral ratio of a peak derived from a cis structure to a peak derived from a trans structure on the 400 MHz $^1$H-NMR spectrum.

Production Example 1 of Diallyl 1,4-Cyclohexanedicarboxylate

Into a 3 l three-necked round flask with a reflux condenser equipped with a Dean-Stark trap, 1,000 g of 1,4-cyclohexanedecarboxylic acid (cis/trans=6.5/3.5) (produced by Eastman Chemical Company), 1,012 g of allyl alcohol, 800 g of benzene and 20 g of p-toluenesulfonic acid were charged. The temperature of an oil bath was adjusted to 100° C. and the reaction was started. During the reaction, the water produced was removed from the 3 l three-necked round flask using the Dean-Stark trap. After 15 hours, the reaction was terminated and the solution in the three-necked round flask was transferred to a 5 l separating funnel. Then, 500 g of an aqueous 1 mass% sodium hydroxide solution was charged into the 5 l volume separating funnel and the separating funnel was shaken and then allowed to stand until a two-phase separation took place in the solution. After removing the aqueous phase, 500 g of an aqueous 1 mass% sodium hydroxide solution was further charged into the 5 l separating funnel, followed by the same operation as above. Furthermore, 500 g of an aqueous 1 mass% sodium chloride solution was charged into the 5 l separating funnel twice and the same operation was repeated twice. Thereafter, benzene and excess allyl alcohol were removed by distillation from the organic phase using an evaporator and the residue was vacuum distilled using a distillation device. The distillation was conducted at 147 to 150° C./0.4 kPa. As a result, 1,300 g of a colorless transparent liquid was obtained (hereinafter referred to as "Sample A"). This liquid was analyzed by gas chromatography, then, the ratio of cis structure to trans structure present in the diallyl 1,4-cyclohexanedicarboxylate was found to 6.5/3.5. The gas chromatography was conducted under the following conditions.

Apparatus used: GC-14B (manufactured by Shimadzu Seisakusho Co., Ltd.)

Detector: hydrogen flame ionization detector

Column used: G column

Temperature condition: starting from 70° C., the temperature was elevated to 220° C. at a rate of 2° C./minute and kept at 220° C. for 10 minutes Production Example 2 of Diallyl 1,4-Cyclohexanedicarboxylate An operation was performed in the same manner as in Production Example 1 of diallyl 1,4-cyclohexanedicarboxylate except for using 1,000 g of 1,4-cyclohexane dicarboxylic acid (trans form: 100%) (produced by Aldrich) in place of 1,000 g of 1,4-cyclohexane dicarboxylic acid (cis/trans=6.5/3.5) (produced by Eastman Chemical Company). Thereafter, distillation was conducted at 147 to 150° C./0.4 kPa, as a result, 1,300 g of a colorless transparent liquid was obtained (hereinafter referred to as "Sample B"). This liquid was analyzed by gas chromatography, then, the trans structure in the diallyl 1,4-cyclohexanedicarboxylate was found to comprise 100%.

Separately, Sample A was mixed with Sample B to prepare diallyl 1,4-cyclohexanedicarboxylate in which the ratio of cis structure to trans structure present in the sample was 2/8 (hereinafter referred to as "Sample C"), diallyl 1,4-cyclohexanedicarboxylate in which the ratio of cis structure to trans structure present in the sample was 5/5 (hereinafter referred to as "Sample D"), and diallyl 1,4-cyclohexanedicarboxylate in which the ratio of cis structure to trans structure present in the sample was 3/7 (hereinafter referred to as "Sample E").

Production 1 of Allyl Ester Compound

Into a 1 l three-necked flask with a distilling unit, 500.0 g of Sample A, 100.5 g of propylene glycol and 0.50 g of dibutyltin oxide were charged. Under nitrogen stream, the system was heated at 180° C. and the generated allyl alcohol was distilled off. When about 115.6 g of allyl alcohol was distilled off, the pressure within the reaction system was reduced to 1.33 kPa to increase the distillation rate. After a theoretical amount of allyl alcohol was distilled off, the system was heated for another one hour and then kept at 180° C. and 0.13 kPa for one hour. Thereafter, the reactor was cooled, then, 448 g of an allyl ester compound was obtained (hereinafter referred to as "Sample F").

The thus-obtained samples were analyzed by gas chromatography (GC-14B: manufactured by Shimadzu Kagaku Co., Ltd., using a hydrogen flame ionization detector and a column OV-17 of 0.5 m, at a constant temperature of 160° C.). Sample F contained 13 mass% of diallyl 1,4-cyclohexanedicarboxylate.

According to 400 MHz $^1$H-NMR (dilute solvent; CDCl$_3$), the ratio of cis structure to trans structure present in the 1,4-cyclohexane dicarboxylate structural units of Sample F was 6.5/3.5.

FIG. 1 shows a 400 MHz $^1$H-NMR spectrum chart of Sample F. The assignment and integral ratio of the chart are shown in Table 1.

Production 2 of Allyl Ester Compound

An operation was performed in the same manner as in Production Example 1 of allyl ester compound except for using 500.0 g of Sample C in place of 500.0 g of Sample A. As a result, 448 g of an allyl ester compound was obtained (hereinafter referred to as "Sample G").

The thus-obtained compound was analyzed by gas chromatography (GC-14B: manufactured by Shimadzu Kagaku Co., Ltd., using a hydrogen flame ionization detector and column OV-17 of 0.5 m, at a constant temperature of 160° C.). Sample G contained 13 mass% of diallyl 1,4-cyclohexanedicarboxylate.

According to 400 MHz $^1$H-NMR (dilute solvent; CDCl$_3$), the ratio of cis structure to trans structure present in the 1,4-cyclohexane dicarboxylate structural units of Sample G was 2/8.

Figure 2:
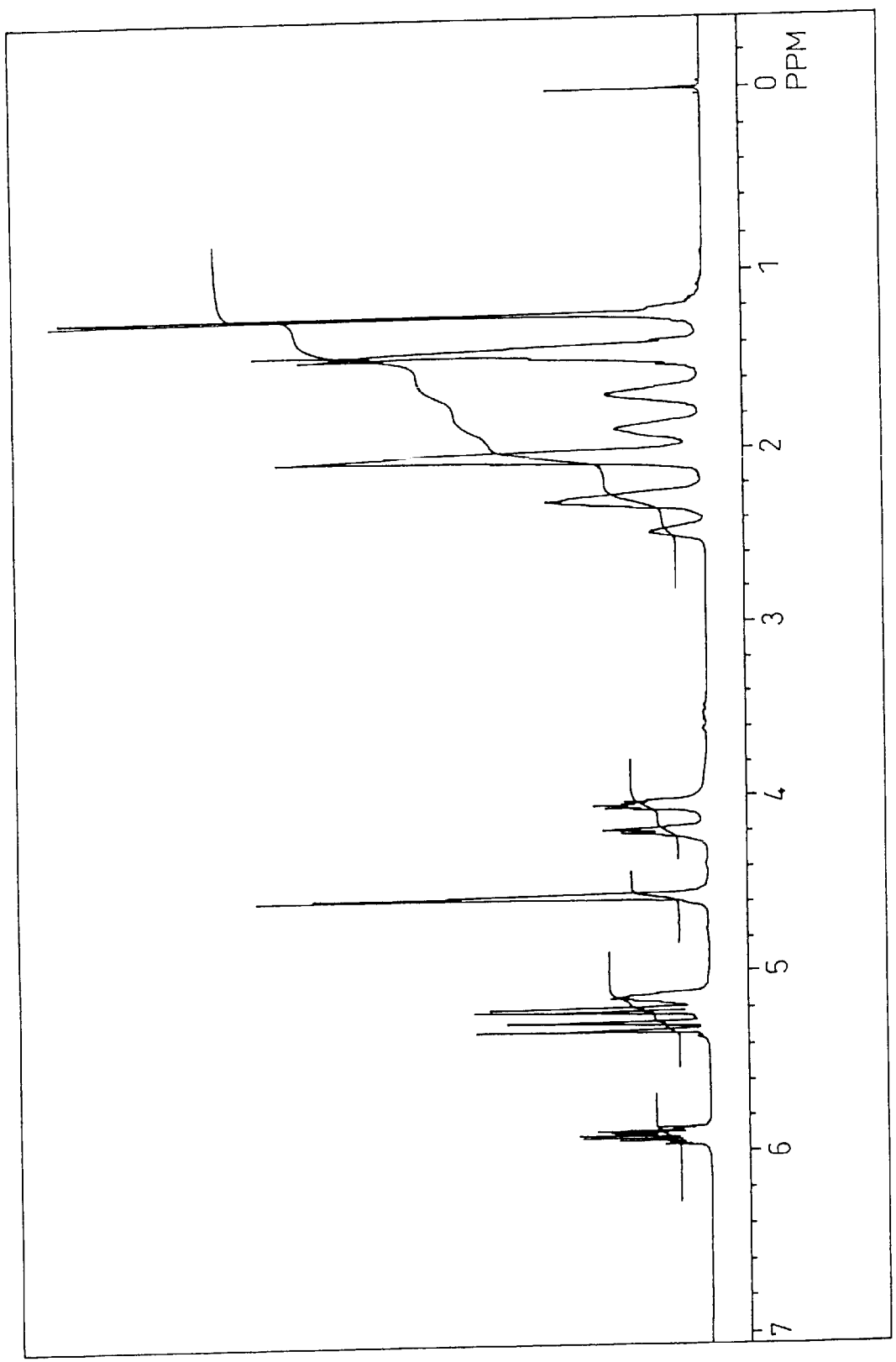
FIG. 2 is a 400 MHz $^1$H-NMR spectrum chart of Sample G (cis/trans=2/8).

FIG. 2 shows a 400 MHz $^1$H-NMR spectrum chart of Sample G. The assignment and integral ratio of the chart are shown in Table 1.

Production 3 of Allyl Ester Compound

An operation was performed in the same manner as in Production Example 1 of allyl ester compound except for using 500.0 g of Sample D in place of 500.0 g of Sample A. As a result, 448 g of an allyl ester compound was obtained (hereinafter referred to as "Sample H").

The thus-obtained compound was analyzed by gas chromatography (GC-14B: manufactured by Shimadzu Kagaku Co., Ltd., using a hydrogen flame ionization detector and column OV-17 of 0.5 m, at a constant temperature of 160° C.). Sample H contained 14 mass% of diallyl 1,4- cyclohexanedicarboxylate.

According to 400 MHz $^1$H-NMR (dilute solvent; CDCl$_3$), the ratio of cis structure to trans structure present in the 1,4-cyclohexane dicarboxylate structural units of Sample H was 5/5.

Figure 3:
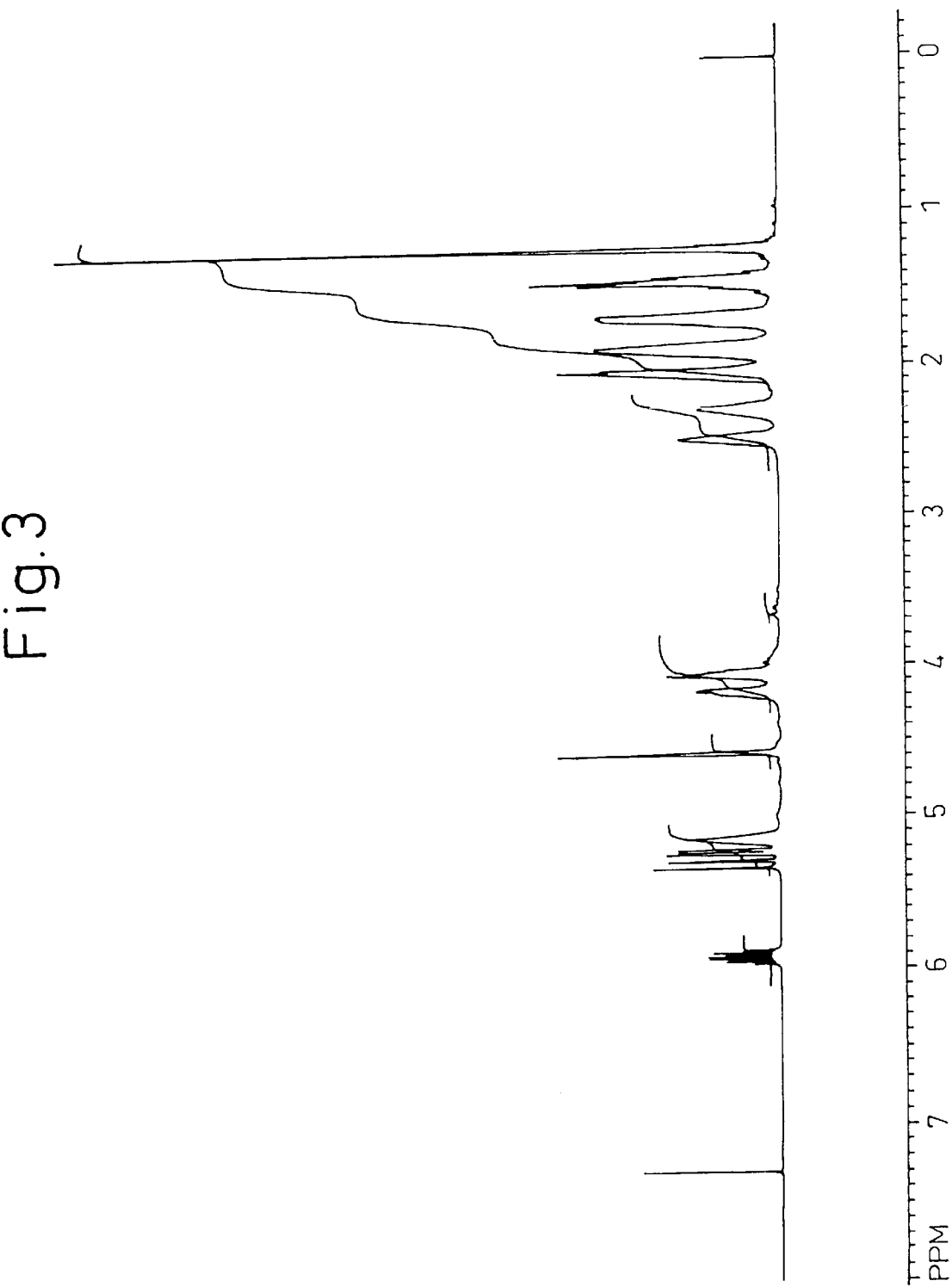
FIG. 3 is a 400 MHz $^1$H-NMR spectrum chart of Sample H (cis/trans=5/5).

FIG. 3 shows a 400 MHz $^1$H-NMR spectrum chart of Sample H. The assignment and integral ratio of the chart are shown in Table 1.

Production 4 of Allyl Ester Compound

An operation was performed in the same manner as in Production Example 1 of allyl ester compound except for using 500.0 g of Sample E in place of 500.0 g of Sample A. As a result, 448 g of an allyl ester compound was obtained (hereinafter referred to as "Sample I").

The thus-obtained compound was analyzed by gas chromatography (GC-14B: manufactured by Shimadzu Kagaku Co., Ltd., using a hydrogen flame ionization detector and column OV-17 of 0.5 m, at a constant temperature of 160° C.). Sample I contained 14 mass% of diallyl 1,4-cyclohexanedicarboxylate.

According to 400 MHz $^1$H-NMR (dilute solvent; CDCl$_3$), the ratio of cis structure to trans structure present in the 1,4-cyclohexane dicarboxylate structural units of Sample I was 3/7.

Figure 4:
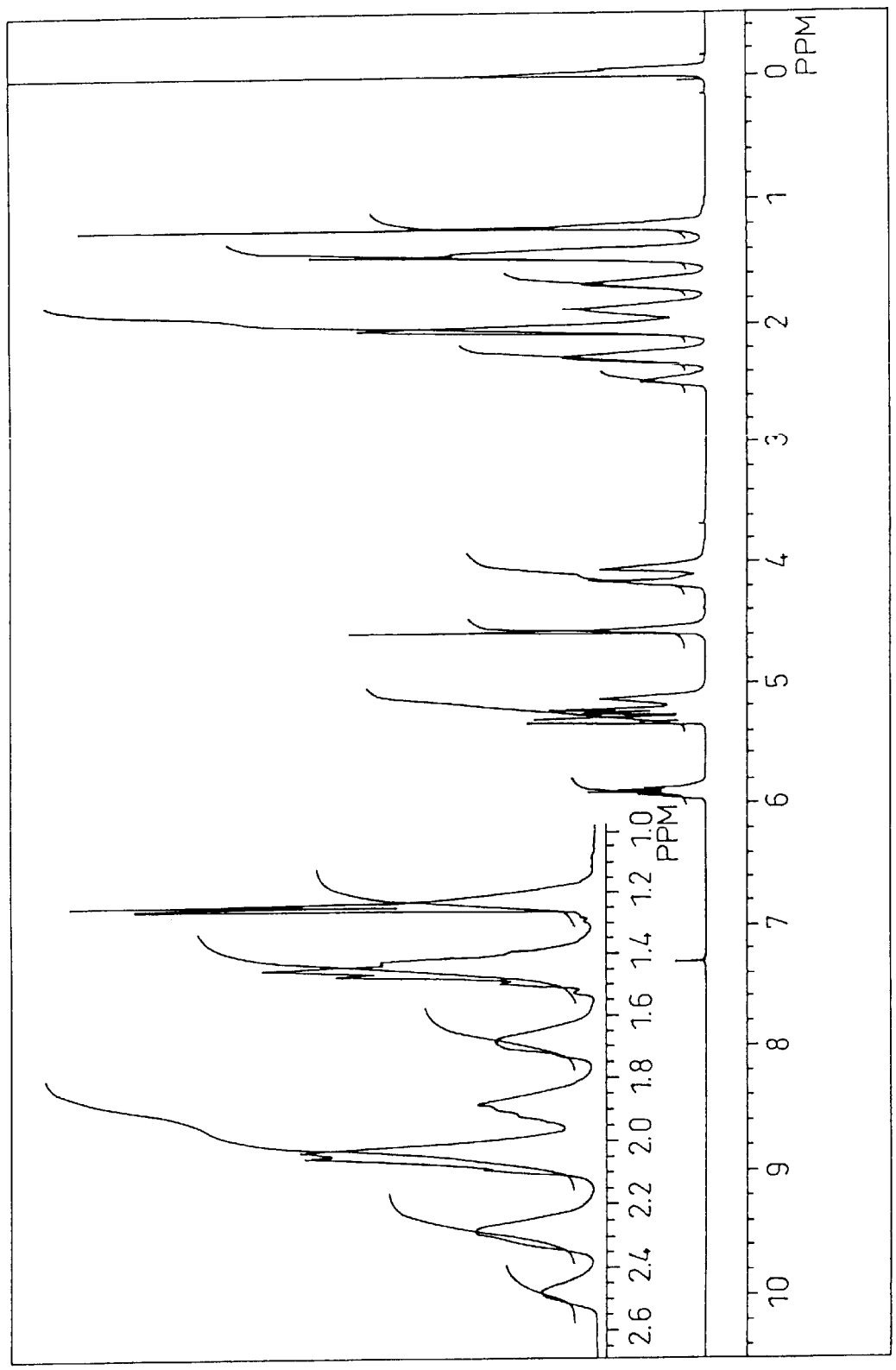
FIG. 4 is a 400 MHz $^1$H-NMR spectrum chart of Sample I (cis/trans=3/7).

FIG. 4 shows a 400 MHz $^1$H-NMR spectrum chart of Sample I. The assignment and integral ratio of the chart are shown in Table 1.

TABLE 1

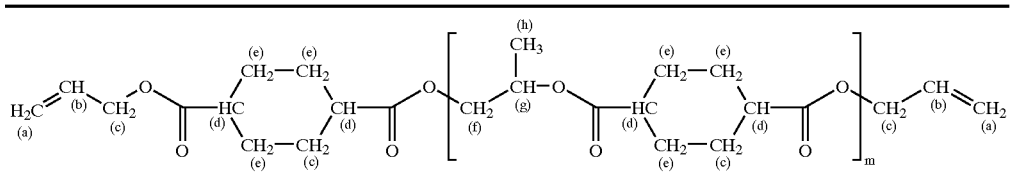

In the structural unit derived from propylene glycol, the bonding style is sometimes reversed, namely, —CH$_2$CH(CH$_3$)— or —CH(CH$_3$)CH$_2$—.

| Sample Name | δ value (ppm) | Assignment | | Integral ratio |
|---|---|---|---|---|
| Sample F | 1.2 | h | | 6 |
| | 1.4 | e | (hydrogen at axial position of trans form) | 4.2 |
| | 1.65 | e | (hydrogen at axial position of cis form) | 7.8 |
| | 1.9 | e | (hydrogen at equatorial position of cis form) | 4.2 |
| | 2.05 | e | (hydrogen at equatorial position of trans form) | 7.8 |
| | 2.3 | d | (trans form) | 2.1 |

TABLE 1-continued

[Structural formula showing a compound with labeled positions (a) through (h), with CH₂=CH-CH₂-O-C(=O)- groups, cyclohexane rings with CH₂-CH₂ groups labeled (e), and a central propylene glycol unit with CH₃ group labeled (h), repeating unit indicated by subscript m]

In the structural unit derived from propylene glycol, the bonding style is sometimes reversed, namely, —CH₂CH(CH₃)— or —CH(CH₃)CH₂—.

| Sample Name | δ value (ppm) | Assignment | | Integral ratio |
|---|---|---|---|---|
| | 2.5 | d | (cis form) | 3.9 |
| | 4.03 4.08 | f | | 4 |
| | 4.58 | c | | 4 |
| | 5.08 | g | | 2 |
| | 5.20–5.38 | a | | 4 |
| | 5.85–5.98 | b | | 2 |
| Sample G | 1.2 | h | | 6 |
| | 1.4 | e | (hydrogen at axial position of trans form) | 9.6 |
| | 1.65 | e | (hydrogen at axial position of cis form) | 2.4 |
| | 1.9 | e | (hydrogen at equatorial position of cis form) | 2.4 |
| | 2.05 | e | (hydrogen at equatorial position of trans form) | 9.6 |
| | 2.3 | d | (trans form) | 4.8 |
| | 2.5 | d | (cis form) | 1.2 |
| | 4.03 | f | | 4 |
| | 4.08 | | | |
| | 4.58 | c | | 4 |
| | 5.08 | g | | 2 |
| | 5.20–5.38 | a | | 4 |
| | 5.85–5.98 | b | | 2 |
| Sample H | 1.2 | h | | 6 |
| | 1.4 | e | (hydrogen at axial position of trans form) | 6 |
| | 1.65 | e | (hydrogen at axial position of cis form) | 6 |
| | 1.9 | e | (hydrogen at equatorial position of cis form) | 6 |
| | 2.05 | e | (hydrogen at equatorial position of trans form) | 6 |
| | 2.3 | d | (trans form) | 3 |
| | 2.5 | d | (cis form) | 3 |
| | 4.03 4.08 | f | | 4 |
| | 4.58 | c | | 4 |
| | 5.08 | g | | 2 |
| | 5.20–5.38 | a | | 4 |
| | 5.85–5.98 | b | | 2 |
| Sample I | 1.2 | h | | 6 |
| | 1.4 | e | (hydrogen at axial position of trans form) | 8.4 |
| | 1.65 | e | (hydrogen at axial position of cis form) | 3.6 |
| | 1.9 | e | (hydrogen at equatorial position of cis form) | 8.4 |
| | 2.05 | e | (hydrogen at equatorial position of trans form) | 3.6 |
| | 2.3 | d | (trans form) | 4.2 |
| | 2.5 | d | (cis form) | 1.8 |
| | 4.03 4.08 | f | | 4 |
| | 4.58 | c | | 4 |
| | 5.08 | g | | 2 |
| | 5.20–5.38 | a | | 4 |
| | 5.85–5.98 | b | | 2 |

EXAMPLE 1

As shown in Table 3, 95.0 parts by mass of diethylene glycol bis(allyl carbonate) (CR-39, a trade name, produced by PPG), 5.0 parts by mass of Sample F and 3 parts by mass of diisopropylperoxy dicarbonate (IPP) were blended and mixed with stirring to form a completely homogeneous solution composition. The viscosity at this time was measured. Thereafter, the vessel containing this solution was placed in a desiccator capable of depressurization and the pressure was reduced by a vacuum pump for about 15 minutes to deaerate gases in the solution. The resulting solution composition was injected by a syringe into a mold fabricated from a glass-made mold for ophthalmic plastic lenses and a resin-made gasket, while taking care to prevent mixing of gas, and then cured in an oven according to a temperature rising program such that heating at 40° C. for 7 hours, heating from 40° C. to 60° C. for 10 hours, heating from 60° C. to 80° C. for 3 hours, heating at 80° C. for 1 hour and heating at 85° C. for 2 hours.

The thus-obtained lens was measured for the refractive index, Abbe number and Barcol hardness, and evaluated for the uneven dyeing. The results thereof are shown in Table 2.

TABLE 2

|  |  | Example |  |  |  |  | Comparative Example |  |
|---|---|---|---|---|---|---|---|---|
|  |  | 1 | 2 | 3 | 4 | 5 | 1 | 2 |
| Blending, parts by mass | Nouryset 200 | 95.0 | 90.0 | 95.0 | 95.0 | 95.0 | 95.0 | 100 |
|  | Sample F | 5.0 | 8.0 |  |  |  |  |  |
|  | Sample G |  |  |  |  |  | 5.0 |  |
|  | Sample H |  |  | 2.0 | 5.0 |  |  |  |
|  | Sample I |  |  |  |  | 5.0 |  |  |
| Viscosity (25° C.) (mPa·s) |  | 28 | 35 | 26 | 28 | 28 | 28 | 25 |
| Initiator IPP (part by mass) |  | 3 | 3 | 3 | 3 | 3 | 3 | 3 |
| Physical properties | Refractive index ($n_D$) | 1.503 | 1.503 | 1.502 | 1.503 | 1.503 | 1.503 | 1.501 |
|  | Abbe Number ($v_D$) | 55 | 54 | 56 | 55 | 55 | 55 | 58 |
|  | Barcol hardness | 31 | 28 | 32 | 31 | 31 | 31 | 33 |
|  | Dyeing failure (number) | 1 | 1 | 2 | 1 | 1 | 1 | 10 |

EXAMPLES 2 TO 5 AND COMPARATIVE EXAMPLES 1 AND 2

Compositions were prepared according to the proportions blending shown in Table 2 and the viscosity was measured in the same manner as in Example 1. After the curing, the compositions were measured for the refractive index, Abbe number and Barcol hardness, and evaluated for the uneven dyeing. The results are shown in Table 2.

TABLE 3

|  | Sample F | Sample G | Sample H | Sample I |
|---|---|---|---|---|
| Appearance just after production | transparent liquid | transparent liquid | transparent liquid | transparent liquid |
| Appearance after storage at 15° C. for 2 weeks | transparent liquid | white colored liquid | transparent liquid | white colored liquid |

TABLE 4

|  | Example 1 | Example 2 | Example 3 | Example 4 | Example 5 | Comparative Example 1 | Comparative Example 2 |
|---|---|---|---|---|---|---|---|
| Proportions: part by mass Nouryset 200 | 95.0 | 90.0 | 95.0 | 95.0 | 95.0 | 95.0 | 100 |
| Sample F | 5.0 | 8.0 |  |  |  |  |  |
| Sample G |  |  |  |  |  | 5.0 |  |
| Sample H |  |  | 2.0 | 5.0 |  |  |  |
| Sample I |  |  |  |  | 5.0 |  |  |
| Appearance of resin composition for plastic lens blended using allyl ester compound just after production | transparent liquid | transparent liquid | transparent liquid | transparent liquid | transparent liquid | transparent liquid | transparent liquid |
| Appearance of resin composition for plastic lens blended using allyl ester compound after storage at 15° C. for 2 weeks | transparent liquid | transparent liquid | transparent liquid | transparent liquid | transparent liquid | white and turbid liquid | transparent liquid |

Change in Appearance (Storage Stability Test)

Samples F, G, H and I were stored at 25° C. for 2 weeks and the appearance was visually compared between the sample just after the production and the sample after storage for two weeks. The results are shown in Table 3. Also, by blending Sample F, G, H or I just after the production or after the storage for two weeks, resin compositions for a plastic lens were prepared and the appearance thereof was compared in the same manner. The results are shown in Table 4.

From the results in Tables 2, 3 and 4, it is proved that, according to the present invention, a lens having excellent storage stability and good dyeability can be produced.

Industrial Applicability

As verified in the foregoing pages, the compound for a plastic lens material of the present invention is a compound excellent in handleability which overcomes the problem of conventional diallyl ester oligomer compounds containing a cyclohexane dicarboxylate structure, such that due to the relatively high crystallinity, the compound becomes white and turbid after the storage for a long period of time at a normal temperature or less.

Therefore, not only the compound for a plastic lens material but also a plastic lens composition containing the compound exhibits excellent storage stability, so that the composition after the storage for a long period of time can be subjected to the casting conventionally used for plastics without applying any particular operation. Moreover, the plastic lens obtained by curing the composition is reduced in dyeing specks as compared to conventional products, so that a more efficient production of plastic lenses can be attained.

What is claimed is:

1. A plastic lens material comprising a compound conztaining a group represented by the following general formula (1) as a terminal group and a group represented by the following general formula (2) as a repeating unit, wherein a part or all of the 1,4-cyclohexane dicarboxylate structural units contained in the compound are a cis structure:

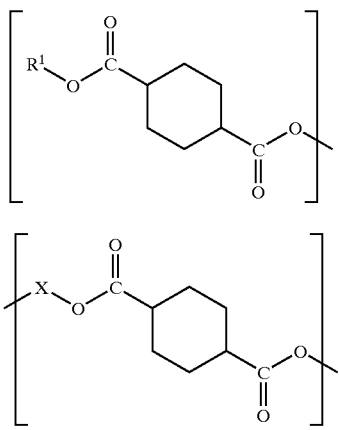

wherein each $R^1$ independently represents an allyl group or a methallyl group and each X independently represents an organic residue derived from a polyhydric alcohol having 2 to 20 carbon atoms and containing 2 to 6 hydroxy groups, provided that X can have a branched structure containing a terminal group of the general formula (1) and a repeating unit of the general formula (2), through an ester bond.

2. A plastic lens material as claimed in claim 1, wherein the ratio of the cis structure is 30% or more based on all 1,4-cyclohexane dicarboxylate structural units.

3. A plastic lens material as claimed in claim 1, or 2, wherein the polyhydric alcohol is propylene glycol.

4. A process for producing a plastic lens material as set forth in claim 1 or 2, comprising the following first and second steps:

first step:
a step of reacting 1,4-cyclohexane dicarboxylic acid containing a cis structure with allyl alcohol and/or methallyl alcohol in the presence of a catalyst to obtain a 1,4-cyclohexane dicarboxylic acid ester; and second step:
a step of performing a transesterification reaction between the 1,4-cyclohexane dicarboxylic acid ester obtained in the first step and a polyhydric alcohol in the presence of a catalyst to obtain a compound for a plastic lens material.

5. A process as claimed in claim 4, wherein the catalyst used in the first step is at least one member selected from the group consisting of p-toluenesulfonic acid, methanesulfonic acid, sulfuric acid and hydrochloric acid.

6. A process as claimed in claim 4, wherein the catalyst used in the second step is at least one member selected from the group consisting of tetraisopropoxy titanium, tetrabutoxy titanium, dibutyltin oxide, dioctyltin oxide, hafnium acetylacetonate and zirconium acetylacetonate.

7. A composition for a plastic lens, comprising at least one plastic lens material as set forth in claim 1 or 2 and at least one compound represented by the following general formula (3):

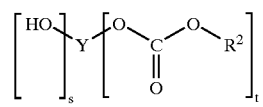

wherein Y represents one or more organic residues derived from a polyhydric saturated alcohol having 2 to 20 carbon atoms and containing 2 to 6 hydroxy groups, each $R^2$ independently represents an allyl group or a methallyl group, provided that where the number of hydroxy groups in Y is n, s is 0 or an integer of n-1, t is an integer of from 1 to n, and s+t n.

8. A composition for a plastic lens, comprising at least one plastic lens material as set forth in claim 1 or 2 and at least one compound represented by the following general formula (3):

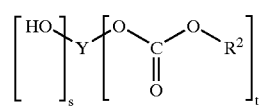

wherein Y represents one or more organic residues derived from a polyhydric saturated alcohol having 2 to 20 carbon atoms and containing 2 to 6 hydroxy groups, each $R^2$ independently represents an allyl group or a methallyl group, provided that where the number of hydroxy groups in Y is n, s is 0 or an integer of n-1, t is an integer of from 1 to n, and s+t=n, wherein said composition comprises:
from 0.05 to 30 mass % of said at least one plastic lens material,
from 50 to 99.5 mass % of at least one compound represented by the general formula (3), and
from 0 to 20 mass % of said at least one monomer copolymerizable with the plastic lens material or the compound represented by the general formula (3).

9. A composition as claimed in claim 7, wherein the compound represented by the general formula (3) is diethylene glycol bis (allyl carbonate).

10. A composition as claimed in claim 7, which further contains 0.1 to 10 parts by mass of at least one radical polymerization initiator per 100 parts by mass of the composition for a plastic lens.

11. A composition as claimed in claim 10, wherein the at least one radical polymerization initiator contains diisopropylperoxy dicarbonate.

12. A plastic lens obtained by curing a composition for a plastic lens described in claim 7.

13. A plastic lens as claimed in claim 12, which has a refractive index at 25° C. of from 1.497 to 1.505.

14. A composition as claimed in claim 8, wherein the compound represented by the general formula (3) is diethylene glycol bis (allyl carbonate).

15. A composition as claimed in claim 8, which further contains 0.1 to 10 parts by mass of at least one radical polymerization initiator per 100 parts by mass of the composition for a plastic lens.

16. A composition as claimed in claim 15, wherein the at least one radical polymerization initiator contains diisopropylperoxy dicarbonate.

17. A plastic lens obtained by curing a composition for a plastic lens described in claim 8.

18. A plastic lens obtained by curing a composition for plastic lens described in claim 9.

19. A plastic lens obtained by curing a composition for a plastic lens described in claim 14.

20. A plastic lens as claimed in claim 17, which has a refractive index at 25° C. of from 1.497 to 1.505.

21. A plastic lens as claimed in claim 18, which has a refractive index at 25° C. of from 1.497 to 1.505.

22. A plastic lens as claimed in claim 19, which has a refractive index at 25° C. of from 1.497 to 1.505.

23. A process for producing a plastic lens as set forth in claim 12, comprising subjecting the composition for a plastic lens to cast polymerization at a temperature of 30 to 120° C. for 0.5 to 100 hours.

24. A process for producing a plastic lens as set forth in claim 17, comprising subjecting the composition for a plastic lens to cast polymerization at a temperature of 30 to 120° C. for 0.5 to 100 hours.

25. A process for producing a plastic lens as set forth in claim 18, comprising subjecting the composition for a plastic lens to cast polymerization at a temperature of 30 to 120° C. for 0.5 to 100 hours.

26. A process for producing a plastic lens as set forth in claim 19, comprising subjecting the composition for a plastic lens to cast polymerization at a temperature of 30 to 120° C. for 0.5 to 100 hours.

* * * * *